(12) United States Patent
Higashigawa et al.

(10) Patent No.: US 11,308,921 B2
(45) Date of Patent: Apr. 19, 2022

(54) INFORMATION DISPLAY TERMINAL

(71) Applicant: Panasonic Intellectual Property Management Co., Ltd., Osaka (JP)

(72) Inventors: Yuto Higashigawa, Nara (JP); Tsuyoshi Maeda, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/105,820

(22) Filed: Nov. 27, 2020

(65) Prior Publication Data

US 2021/0166660 A1 Jun. 3, 2021

Related U.S. Application Data

(60) Provisional application No. 62/941,738, filed on Nov. 28, 2019.

(51) Int. Cl.
*G09G 5/373* (2006.01)
*G06F 3/14* (2006.01)

(52) U.S. Cl.
CPC ............ *G09G 5/373* (2013.01); *G06F 3/14* (2013.01); *G09G 2354/00* (2013.01); *G09G 2360/144* (2013.01); *G09G 2380/10* (2013.01)

(58) Field of Classification Search
CPC ......... G09G 2354/00; G09G 2360/144; G09G 2380/10
See application file for complete search history.

(56) References Cited

U.S. PATENT DOCUMENTS

| | | | |
|---|---|---|---|
| 2012/0154591 A1* | 6/2012 | Baur | B60R 1/00 348/148 |
| 2017/0296099 A1* | 10/2017 | Hancock | A61B 5/4561 |
| 2019/0011712 A1* | 1/2019 | Nagano | G09G 5/38 |
| 2019/0266337 A1* | 8/2019 | Sengupta | G06F 21/84 |
| 2020/0207358 A1* | 7/2020 | Katz | G06F 3/0346 |

FOREIGN PATENT DOCUMENTS

| | | |
|---|---|---|
| JP | 2012-79194 | 4/2012 |
| JP | 2013-254220 | 12/2013 |
| JP | 2015-84002 | 4/2015 |
| JP | 2016-6447 | 1/2016 |
| JP | 2019-527849 | 10/2019 |
| WO | 2018/009399 | 1/2018 |

* cited by examiner

*Primary Examiner* — Samantha (Yuehan) Wang
(74) *Attorney, Agent, or Firm* — Wenderoth, Lind & Ponack, L.L.P.

(57) ABSTRACT

An information display terminal comprises a display controller configured to determine a range to be used by an image display device to display an image on a mirror surface and a sensor unit configured to detect an ambient condition. The display controller determines the range to be used to display an image on the mirror surface using information detected by the sensor unit. The information display terminal is a mirror display having a mirror function on a display surface as well as a function of displaying an image or information on an entire surface or a portion of the mirror surface so that it can provide information while keeping convenience as a mirror.

9 Claims, 11 Drawing Sheets

INFORMATION DISPLAY TERMINAL

CROSS-REFERENCE TO RELATED APPLICATION

This application claims priority to U.S. Provisional Patent Application No. 62/941,738 filed Nov. 28, 2019, the entire contents of which are incorporated herein by reference.

FIELD

The present disclosure relates to a mirror display that not only mirrors a space in front but also displays an image on a mirror surface, and can change a display range for an image according to ambient conditions.

BACKGROUND

Japanese Patent Publication Laid-open No. 2015-84002 discloses a mirror display system that detects a person, reflects a mirror image of the space in front, and displays images three-dimensionally in the mirror. This mirror display system comprises: a mirror display unit that displays images three-dimensionally and reflects a mirror image of the space in front; a distance image sensor unit that acquires distance image data for the space in front of the mirror display unit; a camera unit that captures an image of a person located in front of the mirror display unit; and an image processing unit that detects a three dimensional location of the eyes of the imaged person from the distance image data acquired by the distance image sensor unit and the image captured by the camera unit, and calculates object display parameters for the object displayed three dimensionally by the mirror display unit, according to the detected three dimensional location of the eyes. As a result, a mirror image of the space in front can be mirrored while images can be three-dimensionally displayed in the mirror.

SUMMARY

The present disclosure provides a mirror display that changes an image display range according to an ambient condition and achieves both convenience as a mirror and effectiveness by image display.

An information display terminal according to the present disclosure comprises a member having a mirror surface, an image display device configured to display an image on the mirror surface, a display controller configured to determine a range that the image display device uses to display the image on the mirror surface, and a sensor unit configured to detect an ambient condition. The display controller is configured to determine the range used for displaying the image on the mirror surface according to information detected by the sensor unit.

The mirror display according to the present disclosure is effective for displaying an image while keeping convenience as a mirror.

DETAILED DESCRIPTION

Hereinafter, embodiments will be described in detail, with reference to the drawings when appropriate. Any explanations deemed unnecessary may be omitted. For example, detailed description of well-known aspects or duplicate description of substantially identical components may be omitted. This is to avoid unnecessary redundant description in the following and to facilitate understanding by those skilled in the art.

It should be noted that the accompanying drawings and the following description are provided for those skilled in the art to fully understand the present disclosure, and are not intended to limit the subject matter described in the claims.

Embodiment 1

Hereinafter, Embodiment 1 will be described with reference to FIGS. 1 to 3.

Configuration

In the present embodiment, a mirror display that automatically switches between a mirror and an image display according to a user's situation is embodied. A mirror display is an information display device that is provided with a display surface having a mirror function and has a function of displaying images or information on an entire surface or a portion of the mirror surface. There are several specific configurations for a mirror display, which may include a configuration that is provided with an image display device using a light emitter such as an OLED on a back of a half mirror to display information on the mirror surface, a configuration that switches between a function as a mirror and a function of displaying information by an image display device installed on a back of the mirror, and a configuration that projects information on a mirror surface by a projector.

Figure 1:
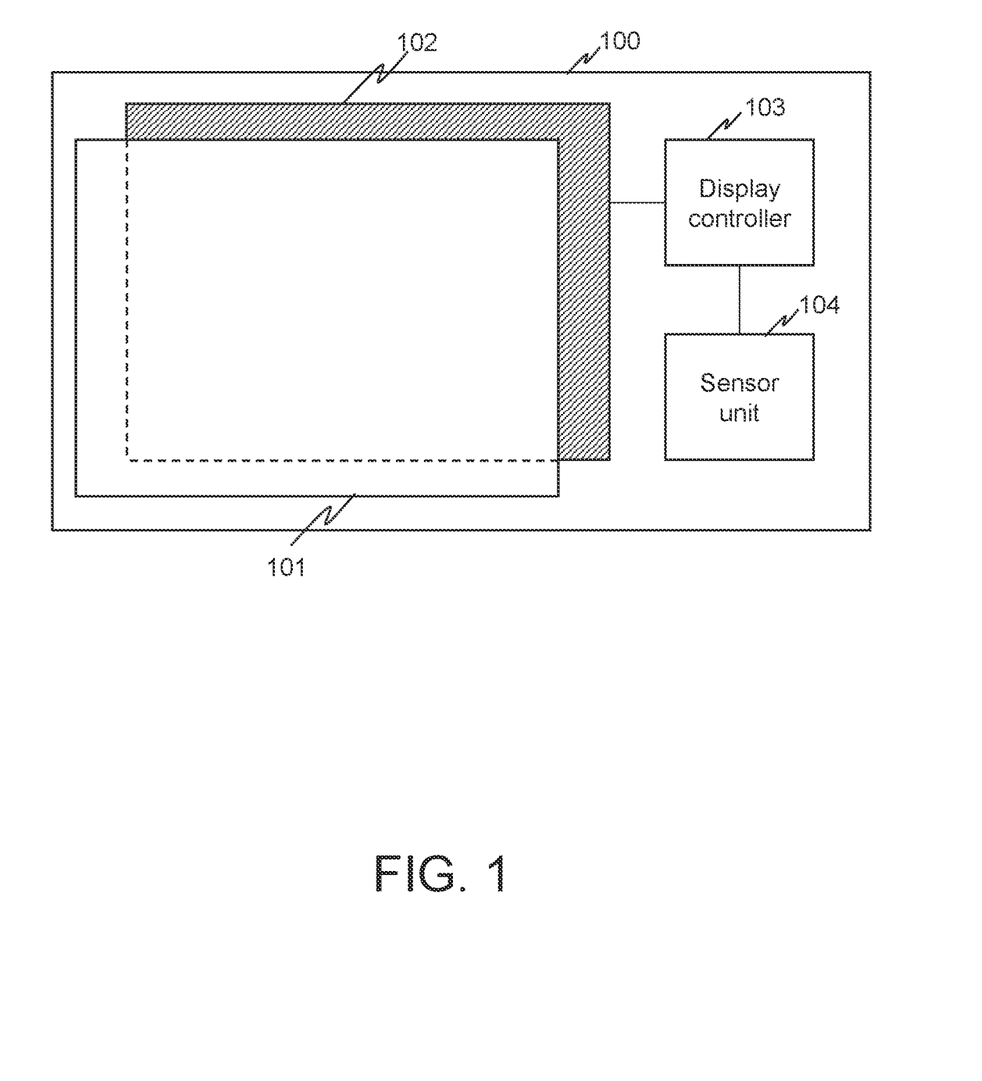
FIG. 1 is a configuration of a smart mirror according to Embodiment 1.

FIG. 1 shows a configuration of a smart mirror according to Embodiment 1. The mirror display 100 in the present embodiment includes a mirror surface 101, an image display device 102, a display controller 103, and a sensor unit 104. The image display device 102 configures an image to be displayed on the mirror surface 101 in the above-described manner.

The sensor unit is hardware having a function of detecting a condition in the vicinity of the mirror display. In the present embodiment, the sensor unit is a device having a function of measuring a distance between the display surface of the mirror display and the user. Specific examples of the sensor unit may include a camera, a TOF sensor, an infrared proximity sensor, a millimeter wave sensor, a temperature sensor, and the like.

The display controller is software or hardware that determines whether the ambient condition is a first state or a second state based on information acquired by the sensor unit. Based on the determination, the display controller determines a range that the image display device 102 displays images. In the present embodiment, the first state is a state in which a distance between the person and the mirror surface is equal to or less than a predetermined threshold, and the second state is a state in which a distance between the person and the mirror surface is equal to or greater than a predetermined threshold.

Operation

Figure 2:
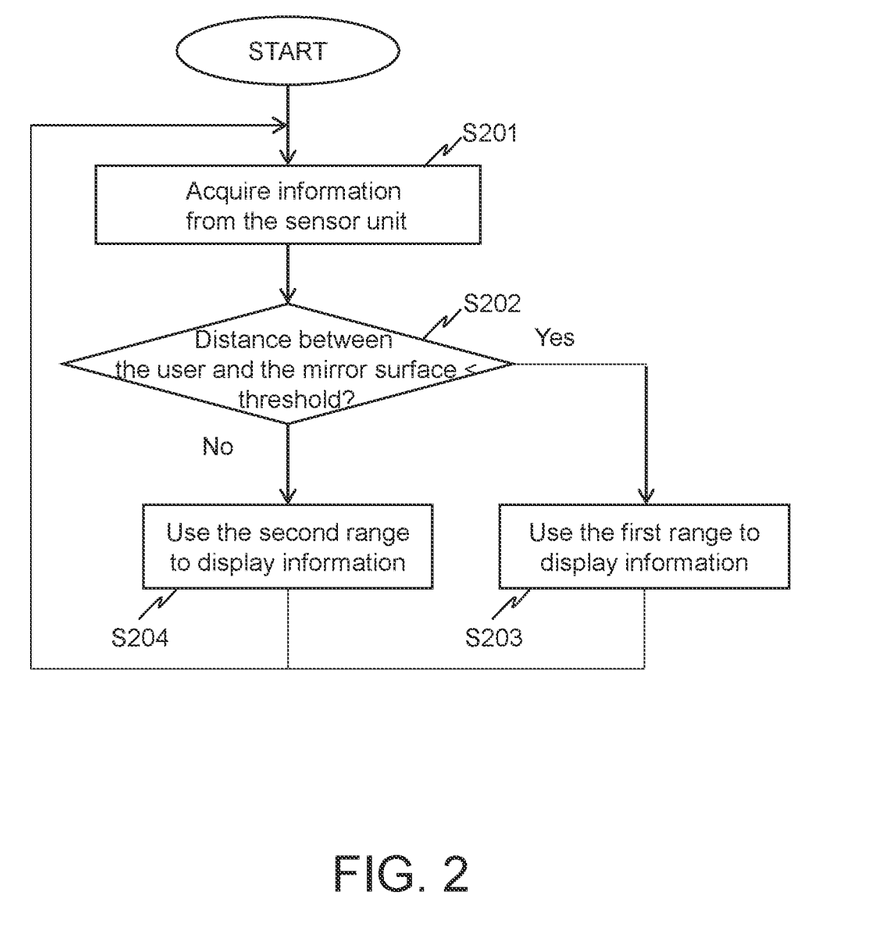
FIG. 2 is a flowchart showing an operation of the smart mirror according to Embodiment 1.

FIG. 2 is a flowchart showing an operation of the mirror display according to Embodiment 1.

First, the display controller 103 acquires, from the sensor unit 104, information pertaining to a distance between the mirror surface 101 of the mirror display 100 and a user (S201). Here, the user represents a person who exists in the vicinity of the mirror display. The information acquired from the sensor unit 104 does not necessarily have to be the exact length of the distance between the mirror surface 101 and the user. Such information as indicating whether or not a person exists within a preset range may be sufficient.

Next, the display controller 103 determines whether or not the distance between the mirror surface 101 and the user is equal to or less than a preset threshold L (S202). Here, the threshold L may be a value that is changed depending on an angle between the mirror surface 101 and the user. That is, the display controller 103 determines whether or not a person exists within the preset range around the mirror surface 101.

If the distance between the mirror surface 101 and the user is less than the threshold, that is, if a person is within the preset range, the display controller 103 drives the image display device 102 so as to use a first range 301 in the mirror surface 101 to display the information (S203). Here, the first range 301 is, for example, a section in a corner of the mirror surface (FIG. 3A). In this case, it can be considered that a person who uses the mirror surface 101 as a mirror exists in the vicinity of the mirror display 100. Therefore, a relatively small portion of the mirror surface is used for displaying information so as not to interfere with a use of the mirror by the user.

If the distance between the mirror surface 101 and the user is greater than the threshold, that is, if there is no person within the preset range, the display controller 103 drives the image display device 102 so as to use a second range 302 in the mirror surface 101 to display information (S203). Here, the second range 302 is, for example, an entire surface of the mirror surface (FIG. 3B). In this case, it can be considered that there is no person who is using the mirror surface 101 as a mirror in the vicinity of the mirror display 100. Therefore, a relatively large portion of the mirror surface is used for displaying information.

After the display controller 103 determines the information display range in the mirror surface 101 as described above, the process returns to 5201 again.

Figure 3A:
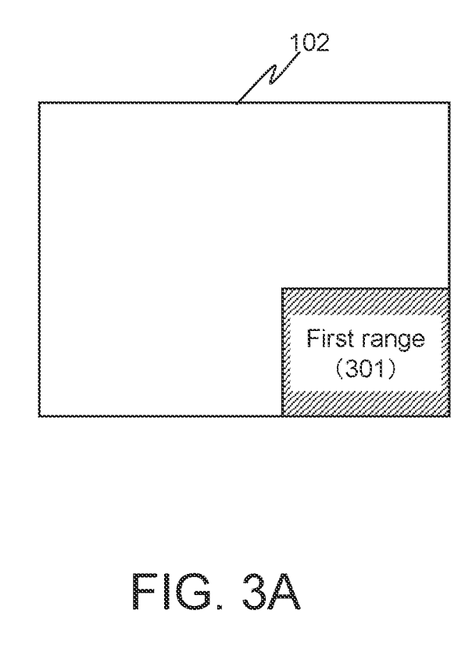
FIGS. 3A and 3B are examples of a display location on the mirror surface in Embodiment 1.
Figure 3B:
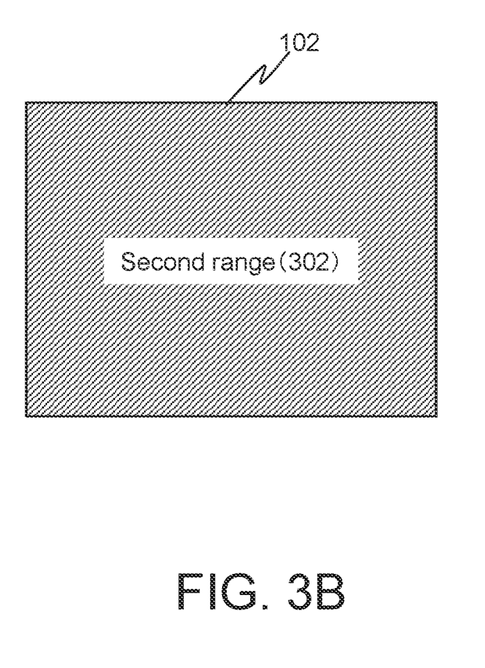

The first range and the second range as illustrated in FIGS. 3A and 3B are only examples. As long as the second range is larger than the first range, the range may be anywhere in the mirror surface.

The area for the first range 301 may not be provided. In other words, according to the present embodiment, when the distance between the mirror surface 101 and the user is smaller than the threshold, no display is performed on the mirror display and the entire display surface may be used as a mirror.

Effects

The mirror display in the present embodiment can automatically switch ranges used for displaying information according to whether or not a user is in the vicinity of the mirror surface.

This is very effective when the mirror display is installed in a lavatory or the like to display information on the mirror display. If the distance between a user and the mirror display is greater than a certain distance because the user is sitting on a toilet seat, etc., a large area of the mirror surface can be used for displaying information to show environmental images or images providing a sense of depth. As a result, the user can use the lavatory without a cooped-up feeling. In addition, if advertisement images or characters are displayed on the mirror display, a large advertising effect can be obtained.

On the other hand, when a user stands up off the toilet seat and comes close to the mirror display, information is not displayed on a portion where the user's face is reflected on the mirror surface so that the mirror display can be used as a mirror. As a result, the user can see his/her face and make up using the display surface of the mirror display.

Other Examples

In the present embodiment, the sensor unit is a device having a function of measuring a distance between a display surface of the mirror display and the user, and the display controller determines whether the distance between the person and the mirror surface is equal to or less than a preset threshold from the information acquired from the sensor unit. However, this is not the only option.

The sensor unit may be hardware or software that has a function of detecting a posture of a person in the vicinity of the mirror display. In this case, the display controller determines whether or not the person is in a certain posture from the information acquired from the sensor unit, and determines the information display range in the mirror surface 101.

For example, the display controller determines whether or not a person in the vicinity of the mirror display is seated from the information acquired from the sensor unit. When the person is seated, the display controller uses the second range 302 of the mirror surface 101 for display. Otherwise, that is, when the person is standing, the display controller uses the first range 301 of the mirror surface 101 for display.

With this configuration, when the user is, for example, sitting on a toilet seat in the lavatory, information is displayed on the mirror display, and when the user stands up off the toilet seat after relieving, the mirror display can be used as a mirror.

The sensor unit as described above can be composed by, for example, a camera with image processing software.

Embodiment 2

Figure 5:
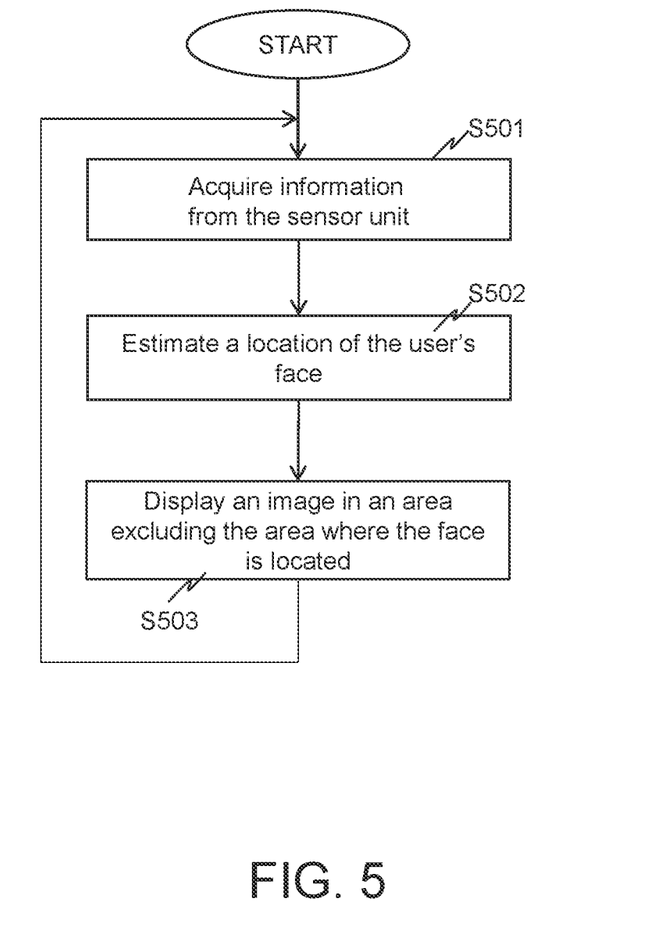
FIG. 5 is a flowchart showing an operation of the smart mirror according to Embodiment 2.
Figure 6:
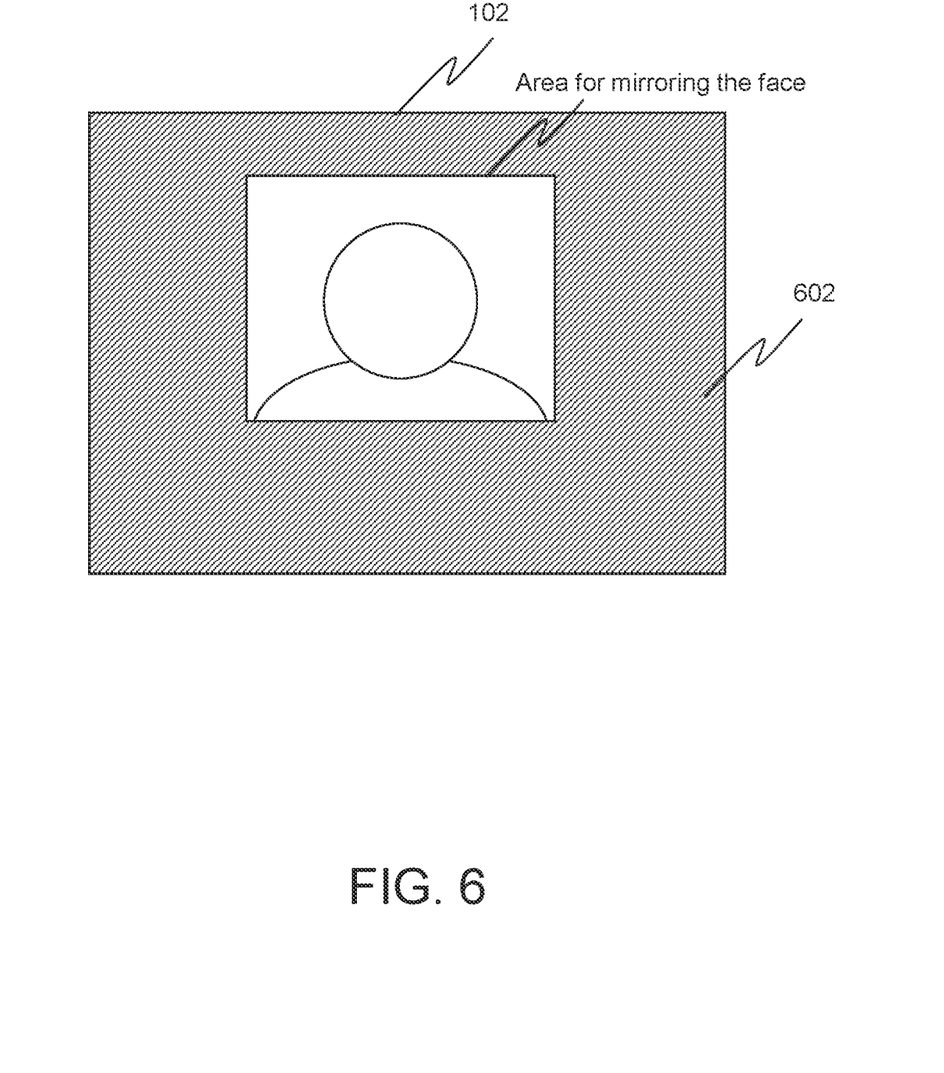
FIG. 6 is an example of a display location on the mirror surface in Embodiment 2.

Hereinafter, Embodiment 2 will be described with reference to FIGS. 4 to 6.

Configuration

In the present embodiment, a mirror display that determines an image display range according to a user's condition is embodied. Similar reference numerals are used in the description and drawings for the components identical with those in Embodiment 1.

Figure 4:
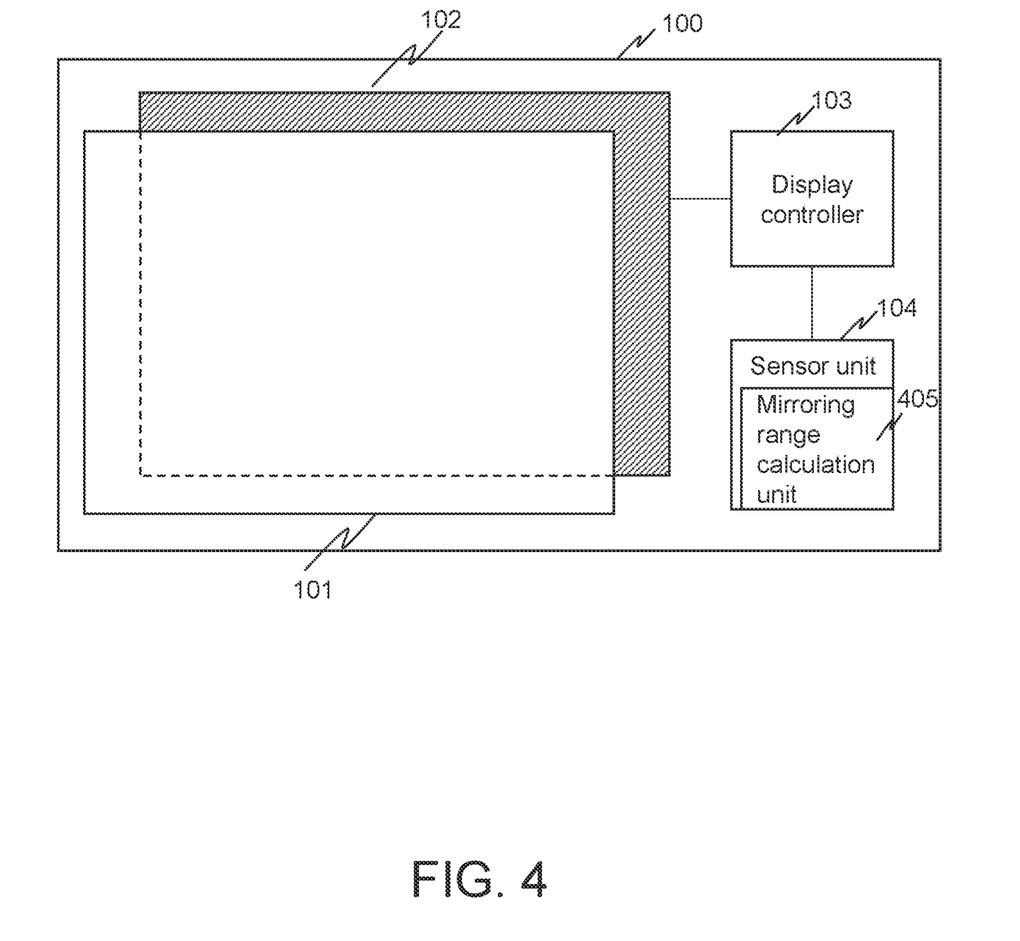
FIG. 4 is a configuration of a smart mirror according to Embodiment 2.

FIG. 4 shows a configuration of a smart mirror according to Embodiment 1. The mirror display 100 in the present embodiment comprises a mirror surface 101, an image display device 102, a display controller 103, and a sensor unit 104. In the present embodiment, the sensor unit comprises a mirroring range calculation unit 405. The mirroring range calculation unit is hardware and software that calculate a range in the mirror surface which mirrors a user's face based on information detected by the sensor unit. Similarly to Embodiment 1, the display controller 103 is configured to determine a range in which images are displayed on the mirror surface 101 based on the information acquired from the sensor unit 104.

In the present embodiment, the sensor unit is hardware having a function of detecting a state in the vicinity of the mirror display and measuring a location of a user's face. As a specific example, the sensor unit may include a camera capable of face recognition or a distance sensor. The sensor unit may be a device in which software operates to, based on the information acquired by the camera or the sensor, estimate an approximate face size of the user or a location where the face is mirrored in the mirror surface 101 as viewed from the user.

The display controller determines, from the information acquired from the sensor unit, a range in which the image display device 102 displays images so as not to display images at a location where the user's face is mirrored in the mirror surface.

Operation

FIG. 4 is a flowchart showing an operation of the mirror display according to Embodiment 2. First, the sensor provided in the sensor unit 104 acquires information pertaining to a location of the user's face (S501). Next, the mirroring range calculation unit 405 estimates a location on which the user's face is mirrored in the mirror surface 101 as viewed from the user (S502). The display controller 103 drives the image display device 102 so as to display images using an area 602 excluding the range calculated by the mirroring range calculation unit 405 (S503) (FIG. 6). In other words, the area for the user's face on the mirror surface can be used as a mirror, while the other area displays images. Images are not displayed at a location where the face is mirrored in the mirror surface, and therefore, it does not interfere with the user using the mirror display as a mirror.

After the display controller 103 determines the information display range in the mirror surface 101 as described above, the process returns to S503 again.

Effects

In the mirror display of the present embodiment, images are not displayed at a location where a user's face is mirrored in the mirror surface. This is very effective, for example, in a case where a mirror display is installed in, for example, a lavatory and displays information without impairing the convenience as a mirror. When the user sees his/her face in the mirror to adjust his/her appearance or when the user makes up, environmental images or images providing a sense of depth can be displayed in an area other than the area for mirroring the face. This allows the user to use a lavatory without a cooped-up feeling. If an advertisement is displayed in an area other than the area for mirroring the face, a large advertising effect can be obtained without impairing the function of a mirror.

Other Examples

In the present embodiment, images are not displayed in an area where a user's face is mirrored in the mirror surface. However, this is the only option.

Embodiment 1 and Embodiment 2 may be combined to detect an area in which a user's face is mirrored in the mirror surface only when the user comes close to the mirror surface, and display images in the other area.

For example, the display controller determines, from the information acquired from the sensor unit, whether a distance between a person in the vicinity of the mirror display and the mirror surface is equal to or less than a threshold. When the person is away from the mirror surface, the display controller uses the entire surface for display. When the person is close to the mirror surface, images are displayed in an area other than the area where the user's face is mirrored in the mirror surface, as viewed from the user.

With this configuration, when a user is away from the mirror in, for example, a lavatory, information is displayed on the mirror display, and when the user comes close to the mirror display to use the mirror, the user can use the mirror in the area where the user's face is mirrored.

This sensor unit can be composed by, for example, a camera with image processing software.

Embodiment 3

Hereinafter, Embodiment 3 will be described with reference to FIG. 7.

Configuration

In the present embodiment, a mirror display that automatically switches between a mirror and an image display according to a user's line of sight is embodied.

A configuration of the present embodiment is the same as that of FIG. 1 in Embodiment 1.

In the present embodiment, the sensor unit is a device such as a camera that detects a user's line of sight.

The display controller is software or hardware that determines whether the ambient condition is a first state or a second state based on information acquired by the sensor unit. Based on the determination, the display controller determines an area in which the image display device 102 displays images. In the present embodiment, the first state is a state in which no person is looking in the mirror, and the second state is a state in which a person is looking in the mirror.

Operation

Figure 7:
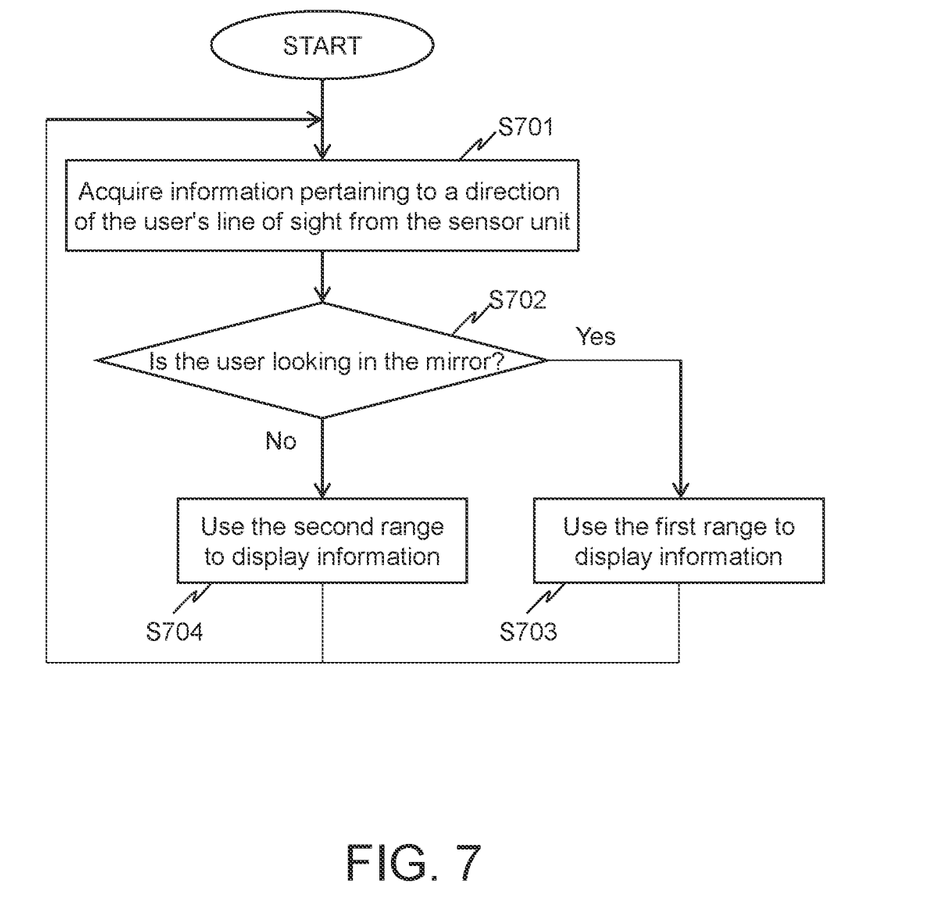
FIG. 7 is a flowchart showing an operation of a smart mirror according to Embodiment 3.

FIG. 7 is a flowchart according to Embodiment 3.

First, the display controller 103 acquires information pertaining to a direction of the user's line of sight from the sensor unit 104 (S701). The information acquired from the sensor unit 104 does not necessarily have to be a direction of the user's line of sight itself. It is sufficient if it can be estimated from the information whether or not the user is looking in the mirror. For example, the direction of the line of sight may be estimated from a positional relationship between a black part and a white part of the user's eyes whose image is captured by a camera. Or more simply, the information may be information on whether or not the user's eyes are included in an image captured by a camera.

Next, the display controller 103 determines, from the information acquired by the sensor unit, whether or not the user is looking in the mirror (S702). Here, this does not necessarily have to be whether or not the user is exactly looking in the mirror. That is, it may be determined whether or not the user is looking in an area in the mirror surface that is preset in advance. More simply, it may be estimated that the user is looking in the mirror if the camera provided in the sensor unit captures an image of the user's eyes.

If the user is not looking in the mirror, the display controller 103 drives the image display device 102 to display information using the second range 302 of the mirror surface 101 (S703). Here, the second range 302 is, for example, an entire surface of the mirror surface (FIG. 3B). In this case, it is considered that a person who uses the mirror surface 101 as a mirror does not look at the mirror display 100, and therefore, a relatively large portion of the mirror surface can be used for displaying information.

If the user is looking at the mirror display, the display controller 103 drives the image display device 102 to display information using the first range 301 of the mirror surface 101 (S703). Here, the first range 301 is, for example, a section in a corner of the mirror surface (FIG. 3A). In this case, it is considered that a person who uses the mirror surface 101 as a mirror is looking at the mirror display 100, and therefore, a relatively small portion of the mirror surface is used for displaying information so as not to interfere with a use of the mirror by the user.

After the display controller 103 determines the information display range on the mirror surface 101 as described above, the process returns to S701 again.

The first range 301 and the second range 302 illustrated in FIGS. 3A and 3B are only examples. For example, the area for the first range 301 may not be provided.

Effects

The mirror display in the present embodiment can automatically switch ranges used for displaying information depending on whether a user is looking in the mirror surface or not.

This is very effective when the mirror display is installed in a lavatory or the like to display information on the mirror display. For example, when the user is not looking at the mirror display because the user is washing his/her hands, a large area of the mirror surface is used for displaying information to show environmental images or images with a sense of depth. As a result, the user can use the lavatory without a cooped-up feeling. On the other hand, when the user is looking at the mirror display, images are displayed in a small area, which allows the user to use the mirror display as a mirror. As a result, the user can use the mirror display to see his/her face and make up.

Other Examples

In Embodiment 3, the display range for images is determined according to whether or not a user is looking in the mirror. However, this can also be combined with Embodiment 2. In particular, when the user is not looking in the mirror, the entire surface is used for the image display range. When the user is looking in the mirror, images can be displayed in an area other than the area where the user's face is mirrored. As a result, only the minimum portion can be used as a mirror, so that a higher effect for displaying information can be expected.

In Embodiment 3, the sensor unit is a device having a function of estimating the direction of a line of sight of a user of the mirror display, and the display controller determines whether or not a person is looking in the mirror from the information acquired from the sensor unit. However, this is the only option. The sensor unit may be hardware or software that has a function of detecting a facial expression of the user of the mirror display, in which the display controller determines a person's emotion from the information acquired from the sensor unit and changes the images to be displayed. For example, the sensor unit may estimate the level of a user's concentration, and based on that information, the display controller may determine a range for displaying images on the mirror surface 101. In other words, when a user is looking in the mirror display in an ambiguous manner, environmental images or an advertisement can be displayed on the mirror display, and when the user is looking in the mirror surface with high concentration, the mirror display can be used as a mirror.

This sensor unit can be composed by, for example, a camera with image processing software or emotion estimation software.

Further, the sensor unit may be hardware or software that determines an attribute of a user of the mirror display. For example, the display controller may determine whether or not the user of the mirror display is a crew member of aircraft from the information acquired from the sensor unit. If the user is a crew member, the mirror display can be used as a mirror so that the user can adjust his/her appearance. On the other hand, if the user is not a crew member, information can be displayed so that an advertising effect can be expected. With this configuration, it is possible to use a mode suitable for an attribute of the user.

This sensor unit can be composed by, for example, a camera with image processing software.

The sensor unit may be hardware or software that has a function of detecting biometric information of a user of the mirror display, in which the display controller estimates a health condition of the person from the information acquired from the sensor unit and changes the range for displaying images. Here, the biological information may be, for example, pulse, blood flow, heart rate variability, or the like. This sensor unit may be composed by, for example, a camera with image processing software, or software and a sensor installed on an object (chair, toilet bowl, faucet, etc.) that the user directly touches.

For example, the display controller can determine whether or not the pulse of a user of the mirror display is quick from the information acquired from the sensor unit. If the pulse is quick, it can be determined that the user is in a state of stress or in a state immediately after moving. In this case, such images that can cool down the user are displayed on the mirror display. If the user's pulse is slow, images are not displayed and the mirror display can be used as a mirror.

Furthermore, the sensor unit may be hardware or software that has a function of detecting an object touched by a user of the mirror display, in which the display controller changes the range for displaying images based on the information pertaining to the object acquired from the sensor unit. For example, when the sensor unit detects that the user whose image is captured by a camera is touching a dryer, the display controller controls the mirror display to be used as a mirror surface. In addition, if the user is touching something that is reminiscent of use of a mirror, such as a brush, shave, his/her hair or face, the mirror display can be controlled to be used as a mirror. Otherwise the mirror display can be controlled to display images.

Embodiment 4

Hereinafter, Embodiment 4 will be described with reference to FIGS. 8 and 9.

Configuration

In the present embodiment, a mirror display that automatically switches image display ranges according to a state of ambient lighting is embodied.

The configuration in the present embodiment is the same as that in FIG. 1 in Embodiment 1. The sensor unit is hardware or software that has a function to acquire a usage status of a light device installed around the mirror display. For example, ambient brightness can be measured using an illuminometer, or ON/OFF of the light device can be directly acquired in conjunction with a light switch. In short, any system can be used as long as it can acquire information that can estimate whether the surroundings of the mirror display are dark or bright.

The display controller can be software or hardware that determines whether the ambient condition is a first state or a second state based on the information acquired by the sensor unit. In the present embodiment, the first state is a state in which a light device is used, and the second state is a state in which a light device is not used.

Operation

Figure 8:
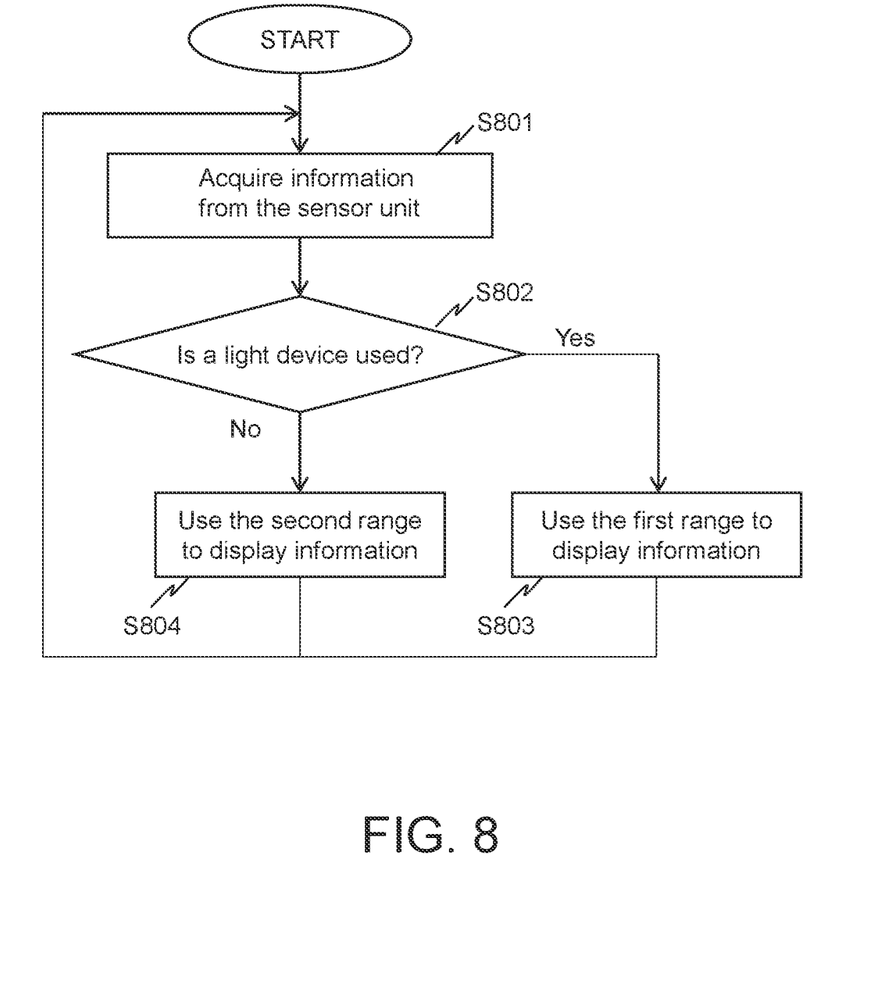
FIG. 8 is a flowchart showing an operation of a smart mirror according to Embodiment 4.

FIG. 8 is a flowchart showing an operation of the mirror display according to Embodiment 4.

First, the display controller 103 acquires, from the sensor unit 104, information pertaining to a usage status of a light device around the mirror display 100 (S801). As described above, the information acquired from the sensor unit 104 does not necessarily have to exactly indicate whether or not a light device is used. It is sufficient if it can be determined whether the surroundings are dark or bright from that information.

Next, the display controller 103 determines whether or not a light device around the mirror display is used, that is, whether or not the surroundings are bright (S802).

If a light device is used, the display controller 103 drives the image display device 102 to display information using a first range 901 in the mirror surface 101 (S803). Here, the first range 901 is, for example, a portion of the mirror surface (FIG. 9A). When a light device is used, it can be considered that the user is using the mirror display as a mirror, and therefore, an area that can be used as a mirror is widely secured.

If no light device is used, the display controller 103 drives the image display device 102 to display information using the second range 902 in the mirror surface 101 (S803). Here, the second range 902 is an area that covers a wider area than the first range 901, which can be, for example, an entire surface of the mirror surface (FIG. 9B). When no surrounding light device is used, it can be considered that the surroundings are dark and the mirror display is not used as a mirror.

After the display controller 103 determines the information display range in the mirror surface 101 as described above, the process returns to S801 again.

Figure 9A:
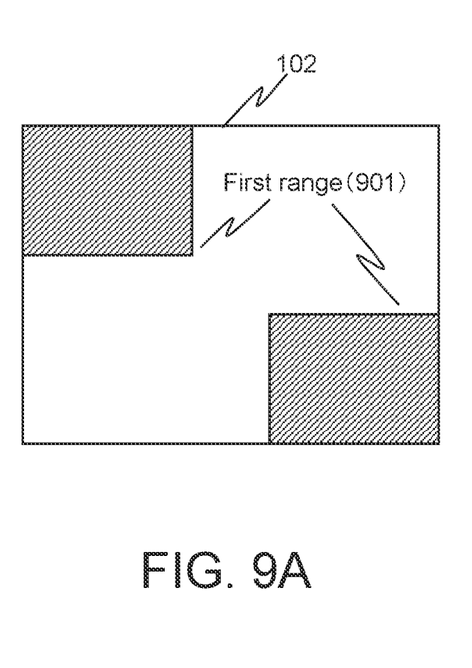
FIGS. 9A and 9B are examples of a display location on the mirror surface in Embodiment 4.
Figure 9B:
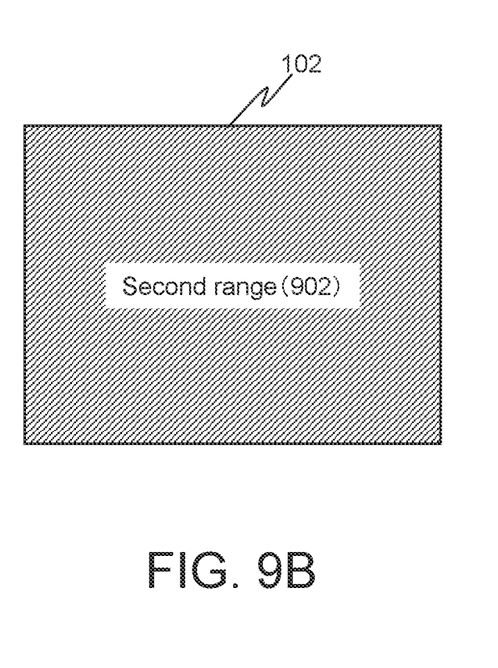

The first range and the second range illustrated in FIGS. 9A and 9B are only examples. As long as the second range is larger than the first range, each area can be of any size in the mirror surface. The area for the first range 901 may not be provided.

Effects

In the present embodiment, the areas used for displaying information can be automatically switched depending on whether or not a light device is used.

This is very effective when displaying information on a mirror display installed around a seat, for example. Information is displayed in a small area when the surroundings are bright, and therefore, the user can readily use a display surface of the mirror display as a mirror. On the other hand, when no light device is used, it can be considered that the user does not use a mirror. In this case, the mirror display can be controlled to use a wide area in the mirror display for displaying information, thereby enabling efficient transmission of information.

Other Examples

In the present embodiment, the sensor unit acquires a usage status of a light device as one example of equipment near the mirror display. The sensor unit may be hardware or software having a function of detecting a usage status of other equipment.

For example, the display controller may determine, from the information acquired from the sensor unit, whether or not a person in the vicinity of the mirror display is using water supply installed around the mirror display. When a person is using the water supply, the display controller uses the first range 901 in the mirror surface for displaying information, and when the person is not using the water supply, the display controller uses the second range 902 in the mirror surface 101 for displaying information.

With this configuration, when a user is using water supply in a lavatory for example, information can be displayed in a small area of the mirror display so that the mirror display can be used as a mirror. When the user is not using water supply, the mirror display can be controlled to display information such as advertisements.

This sensor unit can be composed by, for example, a camera with image processing software, or may be configured to acquire information on a usage status of water supply from a system controlling the water supply.

The sensor unit may detect whether or not the toilet is flushed in a lavatory for example, and the display controller may determine an area for displaying images based on that detection information. With this configuration, images with a sense of depth can be displayed on an entire mirror surface of the display before the user flushes the toilet. As a result, the user can use the lavatory without a cooped-up feeling. In addition, when the user flushes a toilet, the mirror display can be used as a mirror by decreasing the display range of the mirror display.

This sensor unit can use, for example, a sensor that detects water flow in the toilet.

Embodiment 5

Hereinafter, Embodiment 5 will be described with reference to FIGS. 10 to 11.

Configuration

In the present embodiment, a mirror display that automatically switches between a mirror and an image display according to a service situation in an aircraft is embodied.

Here, the service situation is information pertaining to a flight status of the aircraft and/or a status of serving. For example, the information can include information on whether or not passengers are on board, whether or not a service for food and drink is ongoing, whether or not the aircraft is taking off or landing, and/or whether or not the aircraft is arriving at the destination, that is, a remaining time to the landing.

Figure 10:
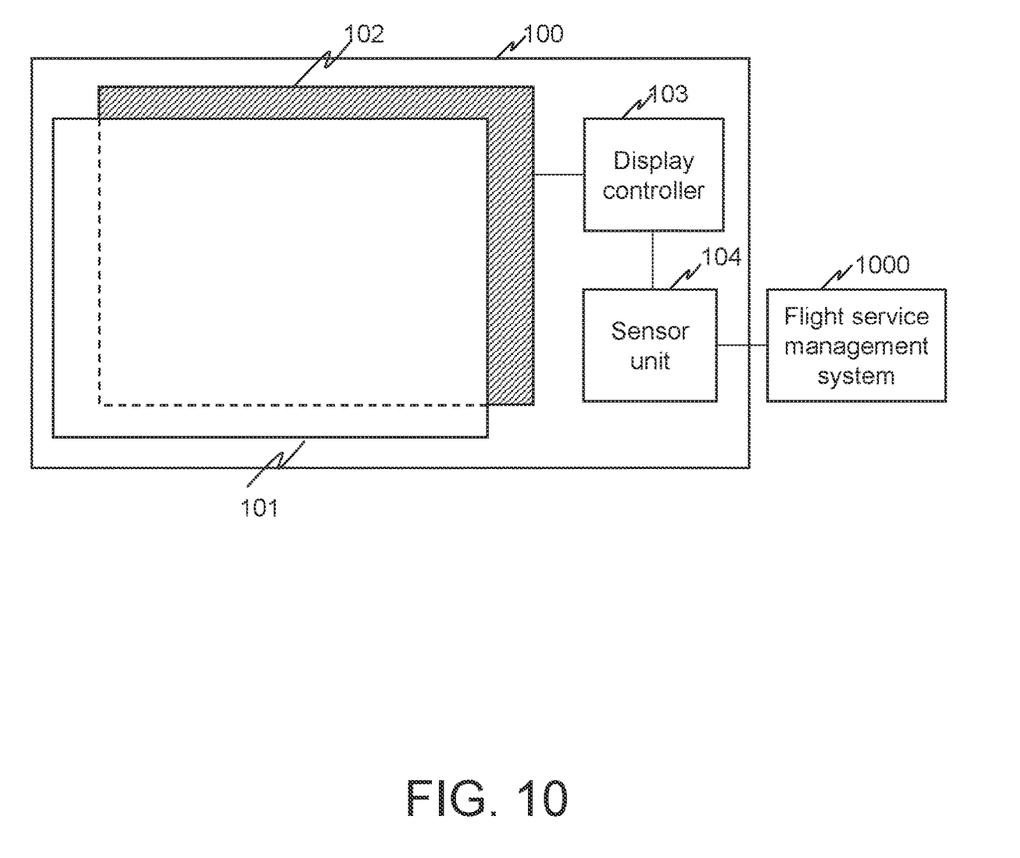
FIG. 10 is a configuration of a smart mirror according to Embodiment 5.

FIG. 10 shows a configuration of the smart mirror according to Embodiment 5. The mirror display 100 in the present embodiment comprises a mirror surface 101, an image display device 102, a display controller 103, and a sensor unit 104. The sensor unit 104 communicates with a flight service management system 1000. The image display device 102 is configured to display images on the mirror surface 101 as described above.

In the present embodiment, the sensor unit may be hardware or software that detects a service situation in the aircraft on which mirror displays are installed. Specifically, such software may be provided that acquires information from the flight service management system 1000 installed in the aircraft system for managing the flight. In the present embodiment, software for acquiring a remaining time to the landing from the flight service management system will be described as an example. The information that the sensor unit acquires from the flight service management system does not necessarily have to be an exact remaining time to the landing, as long as the time to the landing can be estimated. For example, the information may be a distance between the ground surface and the aircraft, or a distance between the destination and the aircraft.

The display controller is software or hardware that determines whether the service situation is in a first state or a second state based on the information acquired by the sensor unit. The display controller automatically switches between a mirror and an image display based on that determination. In the present embodiment, the first state is a state in which a remaining time to the landing is equal to or less than a predetermined threshold, and the second state is a state in which the remaining time to the landing is equal to or greater than a predetermined threshold.

Operation

Figure 11:
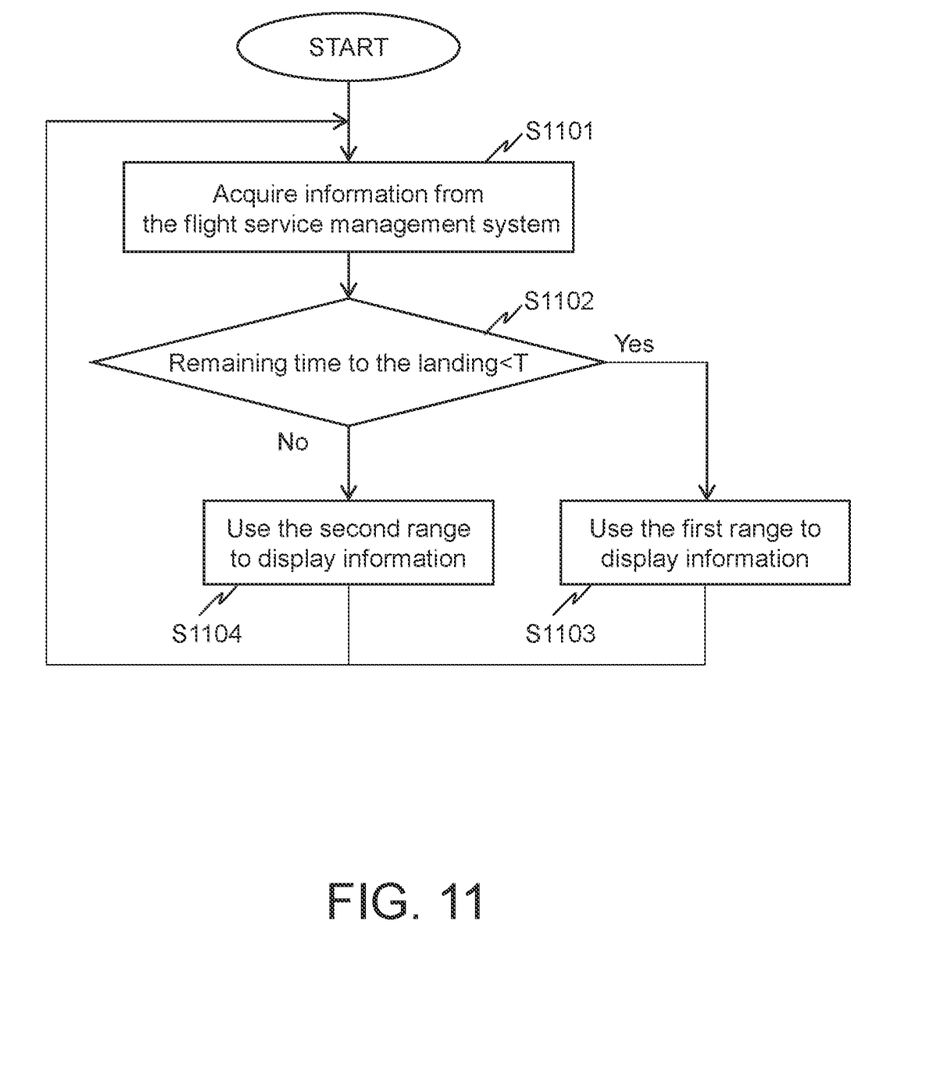
FIG. 11 is a flowchart showing an operation of the smart mirror according to Embodiment 5.

FIG. 11 is a flowchart showing an operation of the mirror display according to Embodiment 5.

First, the sensor unit 104 acquires information pertaining to a remaining time to the landing from the flight service management system 1000 (S1101).

Next, the display controller 103 determines whether or not the remaining time to the landing is equal to or less than a preset threshold T based on the information acquired by the sensor unit (S1102). Here, the threshold T may be a value that is changed depending on information on another service situation.

If the remaining time to the landing is greater than the threshold, i.e. there is still time until the landing, the display controller 103 drives the image display device 102 to display information using the second range 302 in the mirror surface 101 (S1103). The second range 302 is, for example, an entire surface of the mirror surface (FIG. 3B). In this case, it can be considered that a person in the vicinity of the mirror display is unlikely to use the mirror surface to adjust his/her appearance. Therefore, a relatively wide portion of the mirror surface can be used for displaying information.

If the remaining time to the landing is less than the threshold, that is, when the aircraft is going to land, the display controller 103 drives the image display device 102 to display information using the first range 301 in the mirror surface 101 (S1104). The first range 301 is, for example, a section in a corner of the mirror surface (FIG. 3B). In this case, it can be considered that the aircraft is going to land and many passengers want to adjust their appearances using mirrors. Therefore, a relatively narrow portion of the mirror surface is used for displaying information so as not to interfere with a use of the mirror by the user.

After the display controller 103 determines the information display range in the mirror surface 101 as described above, the process returns to 51101 again.

The first range 301 and the second range 302 illustrated in FIGS. 3A and 3B are only examples. For example, the area for the first range 301 may not be provided.

Effects

The mirror display in the present embodiment may automatically switch ranges used for displaying information depending on whether or not the aircraft is going to land. This is very effective when displaying information on the mirror display installed in a galley, for example. When the aircraft is not going to land, a wide area of the mirror surface can be used for displaying information indicating cabin information to crew members. On the other hand, when the aircraft is going to land, information is not displayed on a portion where a user's face is mirrored in the mirror surface so that the user can use it as a mirror. This allows a crew member to use the mirror display to see his/her face in the mirror, make up, and/or adjust his/her appearance.

Other Examples

In the present embodiment, the sensor unit is a device that acquires information pertaining to a service situation from the flight service management system of an aircraft, and the display controller determines whether or not a remaining time to the landing is equal to or less than a threshold, from the information acquired from the flight service management system. However, this is not the only option. The sensor unit may be configured to acquire other service situations.

For example, the sensor unit may be hardware or software that has a function of directly measuring a distance between the ground surface and the aircraft, that is, the altitude, instead of acquiring a remaining time to the landing from the flight service management system. In this case, the display controller may determine whether or not the altitude of the aircraft is equal to or less than a preset threshold from the information acquired from the sensor unit. With this configuration, a similar effect to that of Embodiment 5 can be obtained.

Further, in Embodiment 5, it is determined whether or not the remaining time to the landing is equal to or less than a threshold. However, it may be determined whether or not the takeoff is completed and the flight is stable. Information on whether or not a stable flight is in progress may be acquired by the sensor unit from the flight service management system, or the sensor unit may detect the magnitude of vibration of the aircraft using a vibration sensor or the like. When the aircraft is not in stable flight (for example, when the vibration is large), the display controller uses the second range 302 of the mirror surface 101 for displaying. This is because it can be considered that a passenger is unlikely to use the mirror display as a mirror when the flight is not stable. Otherwise (that is, during stable flight), images are displayed using the first range 301 of the mirror surface 101.

Further, the information pertaining to service situations may include information on whether or not food and drink have been served. For example, the sensor unit may acquire, from the flight service management system, information on whether or not the food and drink service has been served. The second range 302 of the mirror surface 101 is used for displaying before or during provision of the service. Otherwise (that is, after a meal), the first range 301 of the mirror surface 101 is used for displaying. With this configuration, for example, a passenger can enjoy images before and during a meal in the passenger's seat, and after a meal, the mirror display can be used as a mirror to see if there is anything on his/her face.

In the above embodiments, a case where the mirror display is installed in an aircraft has been described as an example. However, the installation location is not limited to an aircraft. For example, mirror displays can be applied to various places where mirrors are used, such as railroads, ships, commercial facilities, and accommodation facilities. In that case, the flight service management system should be replaced with a system that manages information on operations and service provision in each business format.

With the mirror display which is an information display device having a display surface with a mirror function as well as having a function of displaying images or information on an entire surface or a portion of the mirror surface, highly convenient display control can be performed.

REFERENCE NUMERALS

100: Mirror display
101: Mirror surface
102: Image display device
103: Display controller
104: Sensor unit
301: First range
302: Second range
405: Mirror range calculation unit
1000: Flight service management system

The invention claimed is:

1. An information display terminal comprising:
a member having a mirror surface;
an image display device configured to display an image on the mirror surface;
a display controller configured to determine a range that the image display device uses to display the image on the mirror surface; and
a sensor configured to detect a state of a person located near the mirror surface,
wherein
the sensor includes a mirroring range calculation unit configured to calculate a range for mirroring a face of the person in the mirror surface as viewed from the person, and
the display controller does not display an image in the range for mirroring the face in the mirror surface calculated by the mirroring range calculation unit.

2. The information display terminal according to claim 1, wherein the sensor is configured to detect a facial expression of the person.

3. The information display terminal according to claim 1, wherein the sensor is configured to detect biological information of the person.

4. The information display terminal according to claim 1, wherein the sensor is configured to detect an object touched by a hand of the person.

5. The information display terminal according to claim 1, wherein the sensor is configured to detect a usage status of equipment installed around the information di splay terminal.

6. The information display terminal according to claim 1, wherein the sensor is configured to detect a service situation of a moving vehicle in which the information display terminal is installed.

7. The information display terminal according to claim 1, wherein the sensor is configured to detect whether a time remaining until the moving vehicle arrives at a destination is equal to or less than a threshold.

8. An information display terminal comprising:
a member having a mirror surface;
an image display device configured to display an image on the mirror surface;
a display controller configured to determine a range that the image display device uses to display the image on the mirror surface; and
a sensor configured to detect a state of a person located near the mirror surface,
wherein
the sensor is configured to detect whether the person located near the mirror surface is in a first state in which the person stands up, or a second state in which the person is seated, and
the display controller is configured to
set a first range in the mirror surface for displaying when the sensor detects the first state, and
set a second range in the mirror surface for displaying when the sensor detects the second state, the second range including a wider area than the first range.

9. An information display terminal comprising:
a member having a mirror surface;
an image display device configured to display an image on the mirror surface;
a display controller configured to determine a range that the image display device uses to display the image on the mirror surface; and
a sensor configured to detect a state of a person located near the mirror surface,
wherein
the sensor is configured to detect whether the person located near the mirror surface is in a first state in which a line of sight of the person is directed to the mirror surface, or a second state in which a line of sight of the person is not directed to the mirror surface, and
the display controller is configured to
set a first range in the mirror surface for displaying when the sensor detects the first state, and
set a second range in the mirror surface for displaying when the sensor detects the second state, the second range including a wider area than the first range.

* * * * *